United States Patent [19]

Kawolics

[11] 4,179,039
[45] Dec. 18, 1979

[54] CLOSURE FASTENING MEANS

[75] Inventor: Raymond P. Kawolics, Solon, Ohio

[73] Assignee: The Meyer Dairy Products Company, Cleveland, Ohio

[21] Appl. No.: 798,475

[22] Filed: May 19, 1977

[51] Int. Cl.² .............................................. B65D 45/32
[52] U.S. Cl. ...................................... 220/319; 220/95; 220/318; 220/85 H
[58] Field of Search ...................... 220/85 H, 94 R, 95, 220/318, 319, 322; 224/45 C, 45 H, 45 P

[56] References Cited

U.S. PATENT DOCUMENTS

| 3,902,630 | 9/1975 | Knize | 220/319 |
| 4,014,367 | 3/1977 | Milo | 220/318 |

*Primary Examiner*—George T. Hall
*Attorney, Agent, or Firm*—Fay & Sharpe

[57] ABSTRACT

A deep well cooker includes a generally cylindrical cavity having peripheral and bottom walls of thermal insulating material with an electric heating element positioned adjacent the bottom thereof. A metal sleeve positioned in the cavity closely adjacent the peripheral wall extends generally at least between the heating element and the top opening of the cavity. An invertible collar supported adjacent the top opening of the cavity extends upwardly selected different distances for surrounding the upper portions of cooking pots supported in the cavity. A lid and bail assembly is mountable on cooking pots for transporting same from one location to another, and for keeping the pot contents warm.

10 Claims, 12 Drawing Figures

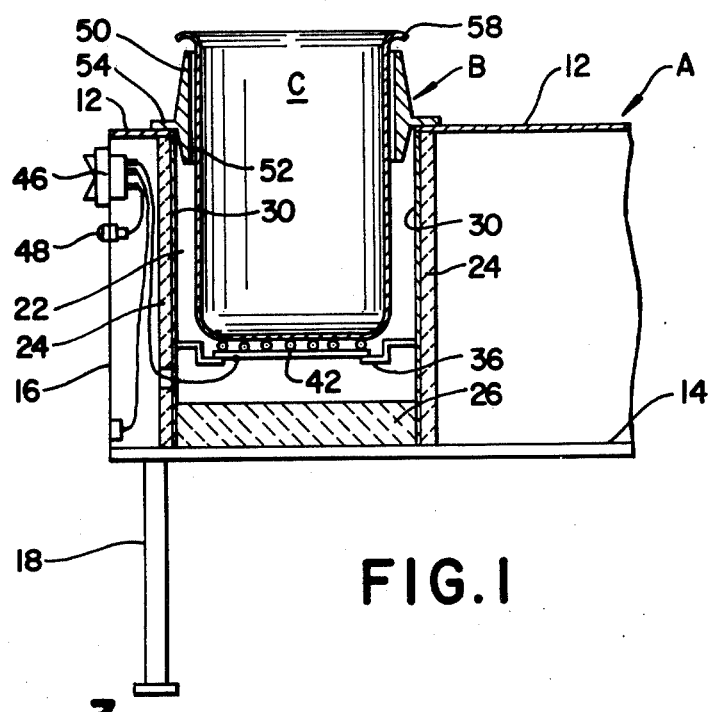
FIG.1
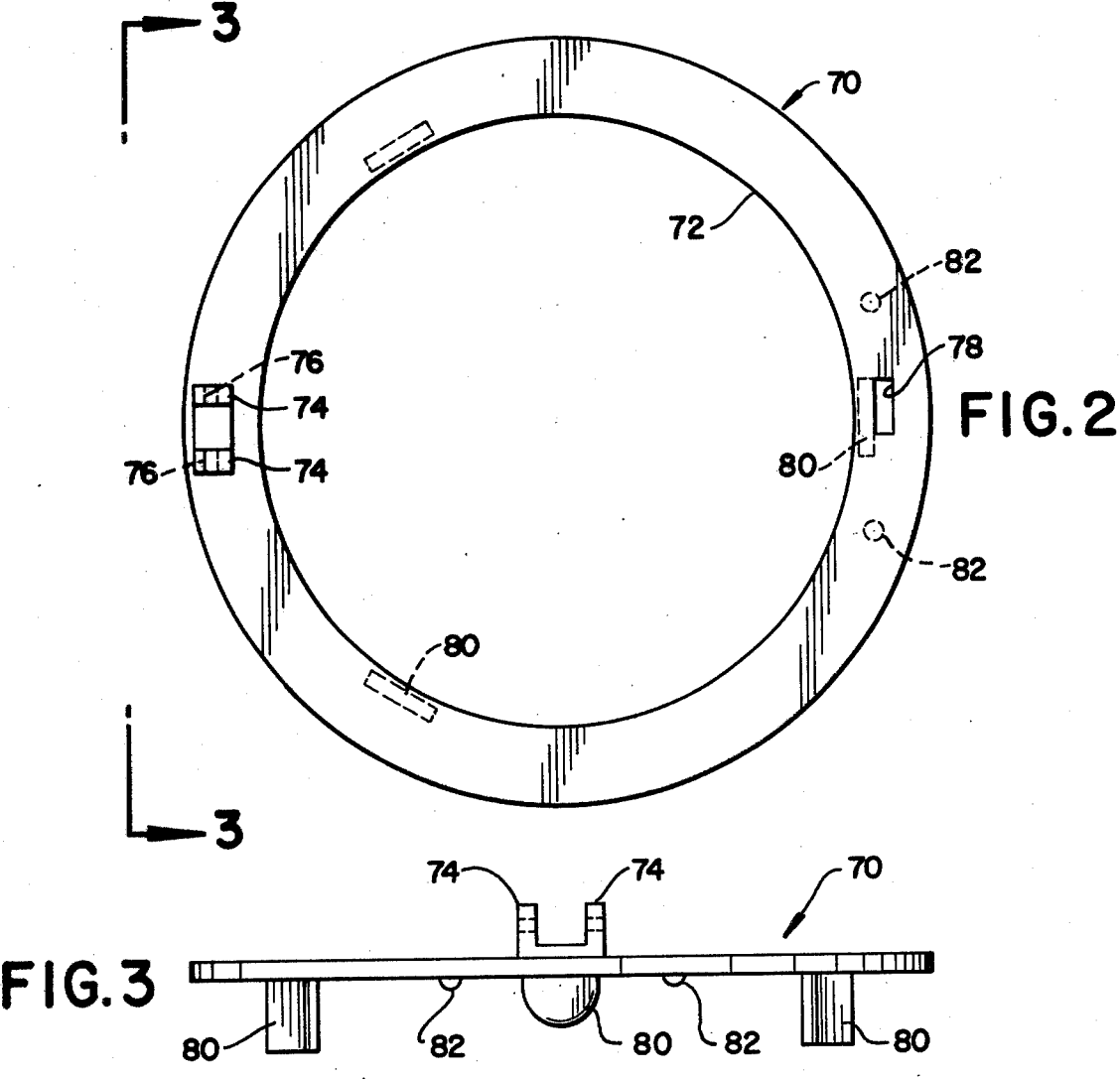
FIG.2
FIG.3

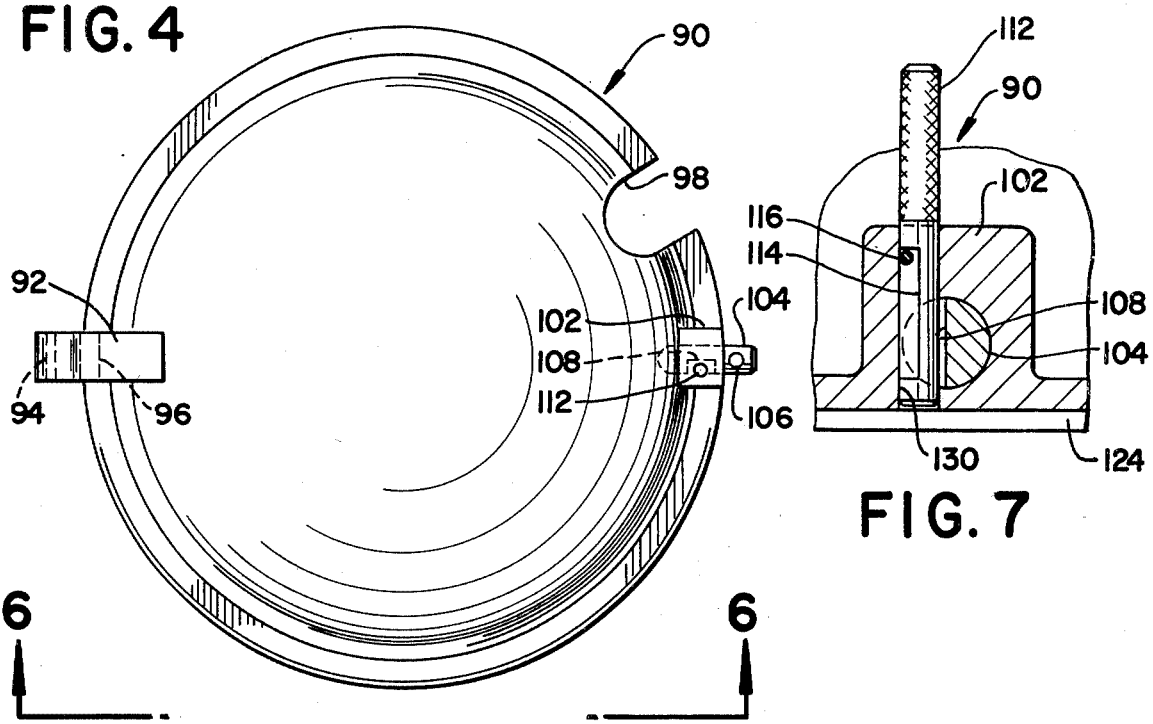
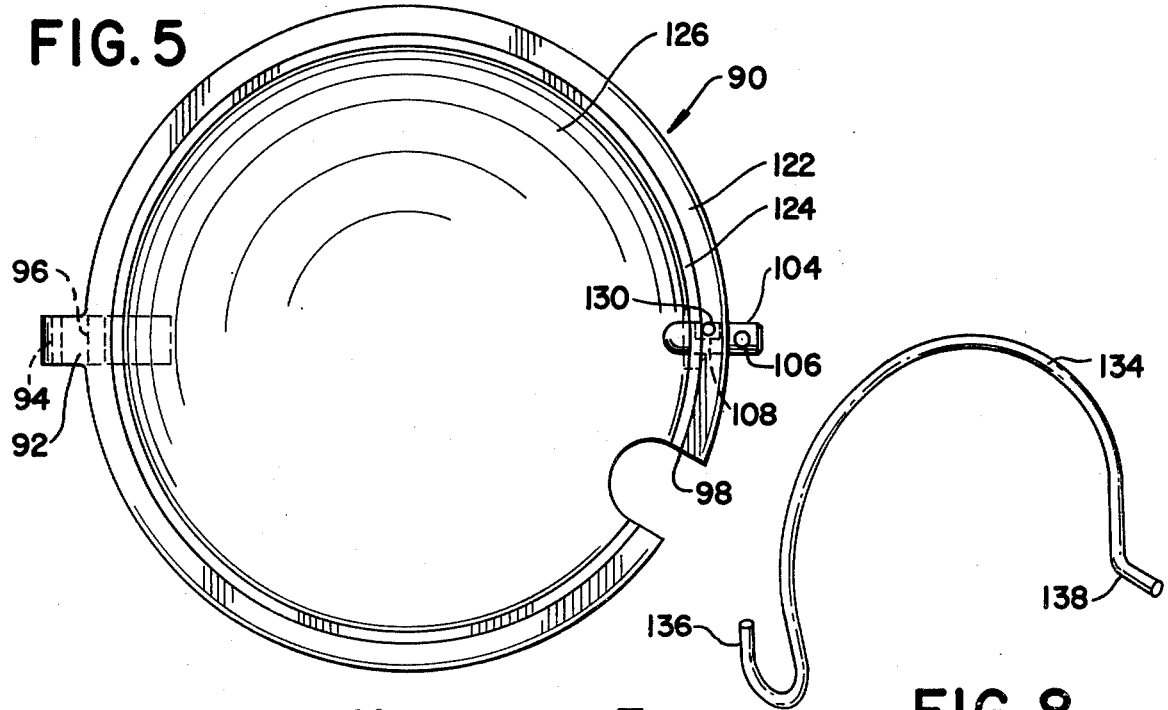
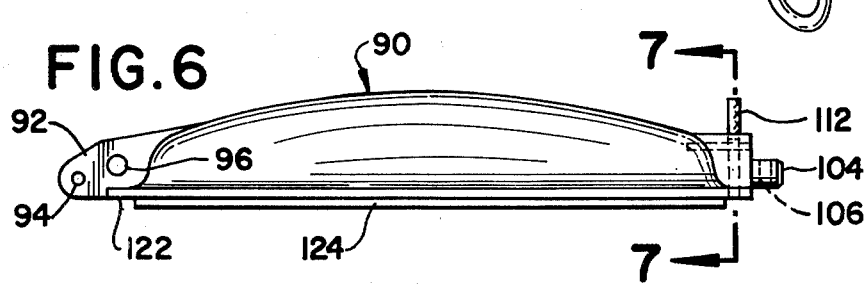

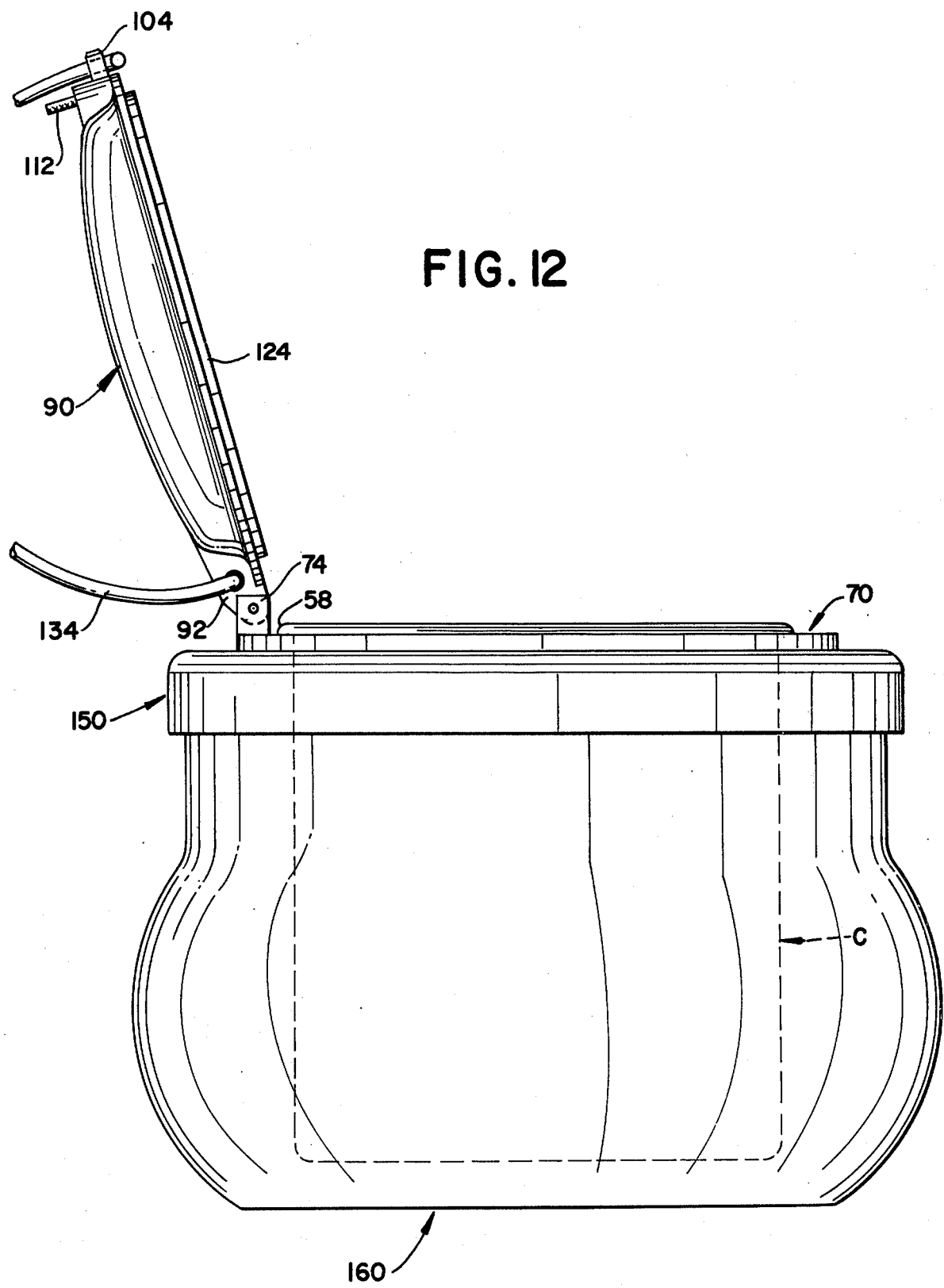

CLOSURE FASTENING MEANS

BACKGROUND OF THE INVENTION

This application relates to the art of cooking and, more particularly, to cooking apparatus of the type commonly known in the trade as a bain-marie. Although the invention is particularly applicable to use with cooking apparatus of the bain-marie type, it will be appreciated that certain aspects of the invention may be used with other devices.

Cooking pots of the bain-marie type are commonly made to have different capacities by simply varying at least the vertical height of the pot, and usually by varying both the height and diameter. When cooking pots of this type are used in a deep well cooker, the upper portions of the pots extend upwardly from the cooker different distances. It has been found desirable to have an arrangement for surrounding the upper portions of the cooking pots with thermal insulating material. It has also been found desirable to surround the top opening in the cooker with a device which would aid in preventing material from falling thereinto. Still further, it is deemed desirable to provide a cooker of this type which would transfer a large amount of heat to the cooking pot very rapidly.

For many reasons and purposes, including ease of washing, it is not desirable to have carrying handles attached permanently to cookng pots of the bain-marie type. However, transporting such pots by cradling the pot in one's arms or grasping the top lip with hot pads is very difficult. Therefore, it has been found desirable to have a detachable transporting device for transporting cooking pots of this type from one location to another and for supporting such pots in a warming kettle or the like. It would also be desirable to have a transporting arrangement which included a lid for maintaining a desired temperature within the pot and which also included a safety lock.

SUMMARY OF THE INVENTION

Apparatus of the type described includes a deep well cooker defined by a generally cylindrical cavity having peripheral and bottom walls of thermal insulating material. The cavity is formed between vertically spaced top and bottom horizontal panels of a cabinet. An electric heating element is positioned in the cavity adjacent the bottom thereof and a metal sleeve is positioned in the cavity closely adjacent the peripheral wall. The sleeve extends generally at least between the heating element and the open top of the cavity and preferably over the entire longitudinal length of the peripheral wall. The insulating material holds the heat within the cavity where it is transferred to a cooking pot positioned in the cavity. The metal sleeve also radiates heat back into the cavity and to a cook pot positioned therein.

An invertible collar is positioned around the top opening of the cavity. This collar includes a generally cylindrical member having opposite axial ends. A flange extends outwardly from the ring member substantially closer to one end than the other to divide the ring member into ring portions of different axial lengths on opposite sides of the flange. The collar is positionable with either ring portion received in the top opening of the cavity such that the other ring portion extends upwardly therefrom. When cooking pots of different capacities are used, the collar can be inverted so the ring portion will extend upwardly from the top opening the desired distance for closely surrounding the upper portion of the cooking pot. The cooking pots themselves are of the type having an outwardly extending circumferential top lip and the ring portions are positioned closely beneath the top lip inwardly thereof so that foreign matter dripping from the lip is deflected away from the cavity by the collar. The collar also aids in holding the heat in the upper portion of the cooking pot and prevents material from falling into the top opening of the cooker cavity.

A lid and bail assembly includes a generally flat support and transport ring member in which a circular opening is defined. A lid member is hinged to the ring member for movement between open and closed positions relative to the opening therein. A bail is attached to at least one of the members for movement between a generally vertical transport position and a generally horizontal serving position. Cooperating locking members between the bail and the members lock the lid member in its closed position when the bail is in its vertical position and releases the lid member for movement to its open position when the bail is in its horizontal position. With an arrangement of this type, the lid and bail assembly can be attached to a cooking pot or detached therefrom whenever desired. Locking of the bail in its vertical transport position prevents separation of the bail from the cooking pot while it is being transported by the bail.

In a preferred arrangement, latch means is provided for latching the bail in its vertical transport position. With the lid member hinged to the ring member at a hinged connection, one end of the bail is connected to the lid member adjacent the hinged connection while the other end portion of the bail is connected to the lid member by passing through a hole in a bail pivot pin. The latch means comprises an elongated vertically movable latch pin movable downwardly to a latching position and upwardly to a released position. A flat on the bail pivot pin cooperates with the latch pin for preventing rotation of the bail pivot pin. When the latch pin is moved upwardly, it is clear of the bail pivot pin in order to allow rotation of the bail pivot pin for movement of the bail to its horizontal position.

In one arrangement, the locking means includes a terminal hook portion on the bail for cooperation with a hole in the flat ring member. In the horizontal position of the bail, the hook portion freely extends through the hole. However, in the vertical position of the bail, the hook portion is locked beneath the ring member and cannot extend through the hole.

The principal object of the present invention is the provision of an improved cooker of the deep well type.

Another object of the invention is the provision of an improved collar for use with deep well cookers.

Still another object of the invention is the provision of an improved lid and bail assembly which can be used for transporting and supporting a cooking pot.

A further object of the invention is the provision of an improved lid and bail assembly having an improved locking arrangement for locking the lid in a closed position.

A still further object of the invention is the provision of an improved lid and bail assembly having an improved latching arrangement for latching a bail in a transport position wherein the lid is also locked in a closed position.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 1 is a side cross-sectional elevational view of a cooking apparatus constructed in accordance with the present invention;

FIG. 2 is a top plan view of a support and transport ring member;

FIG. 3 is an elevational view taken generally on lines 3—3 of FIG. 2;

FIG. 4 is a top plan view of a lid member used with the ring member of FIGS. 2 and 3;

FIG. 5 is a bottom plan view of the lid member of FIG. 4;

FIG. 6 is an elevational view taken generally on lines 6—6 of FIG. 4;

FIG. 7 is a partial cross-sectional elevational view taken generally on lines 7—7 of FIG. 6;

FIG. 8 is a perspective illustration of a bail used with the lid member of FIGS. 4-6;

DESCRIPTION OF A PREFERRED EMBODIMENT

Figure 9:
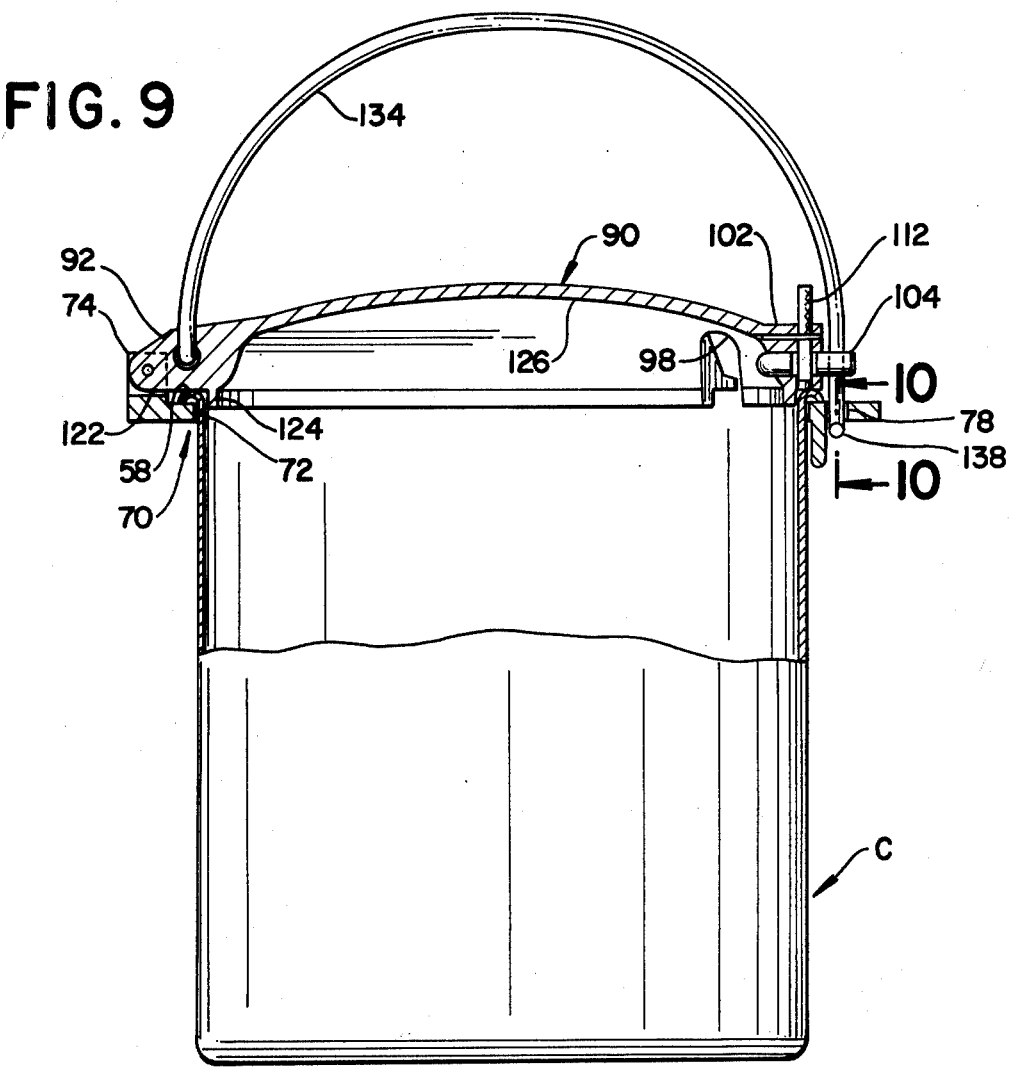
FIG. 9 is a cross-sectional elevational view showing the ring and lid members of FIGS. 2-6 assembled together and positioned on a cookng pot.

Referring now to the drawings wherein the showings are for purposes of illustrating the preferred embodiment of the invention only and not for purposes of limiting same, FIG. 1 shows a partial cross-sectional elevational view of a cabinet A which is preferably constructed from metal with the exterior portion thereof preferably being constructed from stainless steel. However, it will be appreciated that for certain purposes other metals or materials could be advantageously employed. Cabinet A includes vertically spaced apart horizontal top and bottom panels 12,14 and peripheral panels including a front panel 16. Suitable cabinet support legs or the like as at 18 are provided.

A deep well cooker built into cabinet A includes a generally cylindrical vertically elongated cavity 22 having peripheral and bottom walls 24,26 constructed from high temperature resistance thermal insulating material. Any suitable material in the nature of a refractory or the like may be used for peripheral and bottom walls 24,26. In the preferred arrangement, however, a rigid tubular furnace riser material marketed under the trademark KAOWOOL by Babcock & Wilcox Co. is used for peripheral walls 24 and a batting having a blanket-like texture manufactured from this same material and also marketed under the KAOWOOL mark is employed for bottom wall 26. While only one cavity 22 is shown in the drawings and described herein, it will be appreciated that a plurality of such cavities may be included in cabinet A without in any way departing from the overall intent or scope of the present invention.

An open ended cylindrical sleeve 30 defines a liner for cavity 22 and is positioned therein closely adjacent the inner surface of peripheral wall 24. Liner 30 is preferably made of stainless steel and extends between top and bottom panels 12,14. The thermal insulating material which defines cavity bottom wall 26 is received inside liner 30. Suitable stepped supports 36 affixed to liner 30 are provided for supporting an electrical heating element 42 adjacent bottom wall 26 of cavity 22 but spaced upwardly therefrom. While only two such supports are actually shown in FIG. 1, an additional number are normally employed to obtain the desired support and positioning for a heating element and cooking pot. Heating element 42 is suitably connected to a source of electrical energy through a control 46 and an indicator light 48 is provided to tell persons when the cooker is on. Element 42 and control 46 comprise commercially available components.

The top opening of cavity 22 is coincidental with a circular opening in top panel 12 of cabinet A. A collar B is positioned around the top opening as shown in FIG. 1. Collar B includes a generally cylindrical ring member having opposite axial ends which are defined by ring portions 50 and 52 of different axial lengths on opposite sides of an outwardly extending circumferential flange 54. This flange is positioned substantially closer to one axial end of the ring member than to the other axial end. Collar B is positioned with flange 54 resting on panel 12 of cabinet A around the top opening of cavity 22 with ring portion 52 extending downwardly into the top opening of the cavity in close hugging relationship to cylindrical liner 30. Ring portion 50 extends upwardly of the top opening in the manner shown in close surrounding relationship to a cylindrical cooking pot C of the bain-marie type. Cooking pots C are generally manufactured in 8 quart or 12 quart sizes which vary in at least their vertical extent and usually in both their vertical and diametrical extents. FIG. 1 shows a 12 quart pot C whose upper portion extends upwardly of top panel 12 of cabinet A a substantial distance. Therefore, longer ring portion 50 is positioned extending upwardly in surrounding relationship to the upper portion of cooking pot C. When a cooking pot of the 8 quart size is used, its upper portion would extend upwardly of the top opening of cavity 22 a substantially shorter distance than shown in FIG. 1. In such a situation, collar B is simply inverted so that ring portion 50 extends downwardly into cavity 22 while ring portion 52 extends upwardly therefrom in surrounding relationship to the upper portion of the cooking pot. Depending upon the specific relative dimensions of the different cooking pot sizes themselves, it may be necessary to modify the relative dimensions and/or configurations of ring portions 50,52 somewhat from that shown in FIG. 1, although such changes do not depart from the cconcept of the invention involved. The outer side walls of ring portions 50,52 may be tapered inwardly from flange 54 as shown in FIG. 1 to provide convenient means for locating the collar in cavity 22. In the preferred arrangement, collar B is advantageously constructed from aluminum or stainless steel.

Cooking pot C is of the type having an outwardly extending circumferential top lip 58 thereon. With either an 8 or 12 quart size of cooking pot, ring portion 52 or 50 is located closely beneath lip 58 and slightly inwardly thereof so that any material dripping from lip 58 will be deflected by ring portions 50 or 52. Collar B also prevents foreign matter from entering cavity 22 along top panel 12 of cabinet A.

With the arrangement shown and described in FIG. 1, the peripheral and bottom walls 24,26 of high temperature resistance thermal insulating material holds the heat within cavity 22 where it is rapidly transferred to cooking pot C. It has been found possible to obtain a temperature rise of approximately 7° F. per minute of the cooking pot contents with an arrangement of the type described. By way of contrast, a temperature rise of approximately 2° F. per minute was obtainable for the same pot and contents when using a conventional electrical stove with the same size of heating element. Stainless steel liner 30 also reflects a substantial amount of heat back into the cavity, protects the thermal insulating material and makes it very easy to clean the interior of the cavity. Collar B also helps to hold the heat within the upper portion of cooking pot C and aids in preventing the escape of heat from cavity 22. The structural arrangement for cabinet A may be advantageously employed in kitchens where foods are prepared and/or at food serving areas such as those found in cafeterias and the like.

FIG. 2 shows a substantially flat support and transport ring member 70 defining a central circular opening 72. A pair of spaced apart upstanding ears 74 are provided on the outer surface of ring member 70. Suitable holes are provided at 76 through ears 74 for hingedly mounting a lid to ring member 70 in a manner to be described. A generally rectangular hole 78 is formed through ring member 70 opposite from ears 74. Circumferentially spaced projections 80 extend downwardly from ring member 70 adjacent circular opening 70 to their end and small bumps 82 project downwardly from the undersurface of ring member 70 on opposite sides of hole 78.

FIG. 4 shows a circular lid member 90 having an outwardly extending projection 92 with suitable holes 94 and 96 therethrough. Projection 92 is receivable between ears 74 on ring member 70 of FIG. 2 and a suitable retainer pin or rivot is extendable through aligned holes 76,94 to define a hinged connection for hingedly connecting lid member 90 to ring member 70. An arcuate cut-out 98 is formed in the periphery of lid member 90 for receiving a handle of a ladle when the lid member is in a closed position. An enlarged boss 102 on lid member 90 opposite from projection 92 is bored to rotatably receive a bail pivot pin 104. This pin has a hole 106 therethrough outwardly of the periphery of lid member 90 and a flat 108 formed thereon with boss 102. A suitable vertical bore is provided in boss 102 for reciprocatingly receiving a latch pin 112 having a notch 114 therein. Latch pin 112 is movable to a downward latching position shown in FIG. 7 wherein it is aligned with flat 108 on bail pivot pin 104 to prevent rotation thereof. Latch pin 112 is movable upwardly completely clear of latch pin 104 and flat 108 thereon to allow rotational movement of bail pivot pin 104. A small retainer pin 116 extends into a suitable hole in boss 102 parallel to bail pivot pin 104 and is located within notch 114 to prevent complete removal of latch pin 112. Latch pin 112 also holds bail pivot pin 104 within its bore in boss 102.

The underside of lid member 90 has a circumferential flat area 122 extending inwardly from its outer periphery as shown in FIG. 5 and intersects a downwardly extending cylindrical projection 124. Lid member 90 is then domed as at 126 within cylindrical projection 124. Hole 130 visible in FIG. 5 to the left of pin 104 is the vertical hole provided through boss 102 in FIG. 7 for receiving latch pin 112 which defines latch means for preventing rotation or pivotal movement of bail pivot pin 104.

FIG. 8 is a perspective illustration of a generally U-shaped bail 134 having a reversely bent hook portion 136 on one end portion and a straight hook portion 138 at the other end portion. Hook portion 138 extends generally perpendicular to a plane in which the main U-shaped portion of bail 134 lies. Bail hook portion 136 is receivable through hole 96 in a lid member projection 92 of FIGS. 4-6. The other end portion of bail 134 is receivable through bail pivot pin hole 106. Hook portion 136 is freely pivotable relative to projection 92 while the other end portion of bail 134 pivots with rotation of bail pivot pin 104.

FIG. 8 is a perspective illustration of a generally U-shaped bail 134 having a reversely bent hook portion 136 on one end portion and a straight hook portion 138 at the other end portion. Hook portion 138 extends generally perpendicular to a plane in which the main U-shaped portion of bail 134 lies. Bail hook portion 136 is receivable through hole 96 in lid member projection 92 of FIGS. 4-6. The other end portion of bail 134 is receivable through bail pivot pin hole 106. Hook portion 136 is freely pivotable relative to projection 92 while the other end portion of bail 134 pivots with rotation of bail pivot pin 104.

FIG. 9 shows the lid and bail assembly of lid member 90, ring member 70 and bail 134. This lid and bail assembly is mounted on a cooking pot C which is generally cylindrical and dimensioned for close reception through circular ring member opening 72. Outwardly extending circumferential lip 58 on cooking pot C rests against the upper surface of ring member 70 around the periphery of circular hole 72. Cylindrical projection 134 on lid member 90 is dimensioned for close reception within the opening top of cooking pot C as shown in FIG. 9. Flat area 122 extending inwardly from the outer periphery of lid member 90 is positioned against top lid 58. With this in mind, the hinged connection between ring member 70 and lid member 90 is such that there is a vertical space between the under surface of lid member 90 defined by downwardly facing surface 122 and the upwardly facing opposed surface of ring member 70. Circumferential top lip 58 is received between these under and upper surfaces of the lid member and ring member in the manner shown in FIG. 9.

Figure 10:
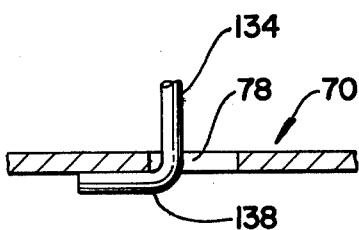
FIG. 10 is a partial cross-sectional elevational view taken generally on lines 10—10 of FIG. 9.

In the horizontal position of bail 134 wherein it lies substantially parallel to ring member 70, bail hook portion 138 is substantially aligned with the axis of hole 78 so it will freely extend therethrough. This allows pivotal movement of the lid member relative to the ring member. With bail hook portion 138 extending through hole 78 in a horizontal position of the bail, pivotal movement of bail 134 to a vertical transport position moves bail hook portion 138 to the position shown in FIG. 10 wherein it extends substantially perpendicular to the vertical axis of hole 78 and generally parallel to the flat surfaces of ring member 70. In this position, bail hook portion 138 is not extendible through hole 78 and locks lid 90 in a closed position relative to ring member opening 72. Downward pivotal movement of bail 134 to a generally horizontal position will again allow bail hook portion 138 to extend through hole 78 in ring member 70 so that lid member 90 can be pivoted upwardly about its hinged connection generally to the position shown in FIG. 12.

In the vertical position of bail 134, a transport position is defined. Bail 134 can be locked in this vertical transport position by moving pin 112 downwardly to the position shown in FIG. 7 with bail pivot pin flat 108 closely adjacent latch pin 112. This prevents pivotal movement of bail pivot pin 104 so that bail 134 is latched in its vertical transport position so the lid and bail assembly are locked onto the top lip of the cooking pot and the lid is also locked in its closed position. Latch pin 112 can be grasped to pull it upwardly clear of bail pivot pin 104 to allow pivotal movement of bail 134 and bail pivot pin 104. Bail hook portion 138 and hole 78 in ring member 70 cooperate to define locking means for releasably locking lid member 90 in a closed position. Latch pin 112 defines latch means for latching bail 134 in its vertical transport position.

Figure 11:
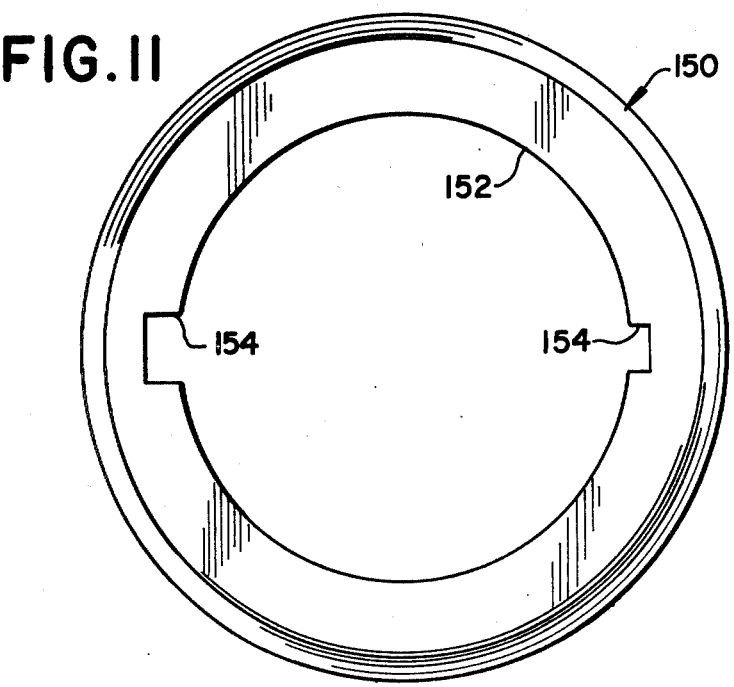
FIG. 11 is a top plan veiw of a decorative support ring used on the top of a warming kettle; and, FIG. 12 is an elevational veiw showing a warming kettle having the lid and bail assembly of the present application mounted on a cooking pot supported in a warming kettle.

FIG. 11 shows a decorative ring member 150 having a circular central opening 152 and opposed notches 154. Ring member 150 is positioned around the top periphery of a large warming kettle 160 of cast aluminum or the like which may be electrically heated, and may have water positioned therein if so desired. With the lid and bail assembly mounted on a cooking pot in the manner shown in FIG. 9, the assembly and pot can be carried to the warming kettle 160 of FIG. 12. Downwardly extending projections 80 on ring 70 in FIG. 2 will be closely receivable through opening 152 in decorative ring member 150 of FIG. 11. The assembly is located in a support position on decorative ring member 150 as shown in FIG. 12. Projection 80 and hole 78 are aligned with a notch 154 to allow free movement of bail hook portion 138 between its locking and released positions. Small projections 82 extend outwardly from the under surface of ring member 70 a distance substantially the same as the thickness of the wire which forms bail 134 itself. This allows ring member 70 to be positioned on a decorative or support ring member when bail hook portion 138 is not aligned with a notch 154. Projections 82 will stabilize ring member 70 so it does not wobble as it would if resting only on bail hook portion 138.

FIG. 12 shows lid member 90 pivoted upwardly to an open position so that food such as soup, stew and the like can be ladled from pot C. After individual servings have been removed from pot C, lid 90 can again be closed for maintaining the food at a desired high temperature. Cut-out 98 in the periphery of lid member 90 allows the ladle to remain in the pot when the lid is closed so that it is readily accessible for additional servings as the need arises. If desired, the lid and bail assembly can be mounted on a cooking pot when the contents are being cooked or heated to a desired serving temperature as in, for example, the cabinet A shown in FIG. 1. Moreover, one lid and bail assembly can be used with a plurality of cooking pots if so desired. When the contents of one cooking pot have been served from a kettle 160 in FIG. 12, the entire assembly is easily moved back to the kitchen where the lid and bail assembly can be removed and positioned on another cooking pot full of prepared food for transport back to the serving kettle.

Although the invention has been shown and described with respect to a preferred embodiment, it is obvious that equivalent alterations and modifications will occur to others skilled in the art upon the reading and understanding of the specification. The present invention includes all such equivalent alterations and modifications, and is limited only by the scope of the claims.

Having thus described my invention, I now claim:

1. A lid and bail assembly for cooking pots or the like comprising: a generally flat transport ring member defining a circular opening; a lid member hinged to said ring member for movement between open and closed positions relative to said opening; a bail attached to at least one of said members for movement between a generally vertical transport position and a generally horizontal serving position; and, cooperating locking means between said bail and said ring and lid members for locking said lid member in said closed position with said bail in said generally vertical position and for releasing said lid member for movement to said open position with said bail in said generally horizontal position.

2. The lid and bail assembly as defined in claim 1 including releasable latch means for releasably latching said bail in said generally vertical position.

3. The lid and bail assembly as defined in claim 1 wherein said ring member has an upper surface and said lid has an under surface facing said upper surface, said lid member being hinged to said ring member for positioning said upper and under surfaces in spaced relationship whereby an outwardly extending circumferential top lip on a cooking pot is closely positionable in the space between said upper and under surfaces.

4. The lid and bail assembly as defined in claim 1 including a generally cylindrical cooking pot dimensioned for close reception through said circular opening in said ring member, said pot having an outwardly extending circumferential top lip positioned between said ring and lid members.

5. The lid and bail assembly as defined in claim 1 wherein said bail is attached to said lid member and said locking means is between said bail and said ring member.

6. The lid and bail assembly as defined in claim 5 wherein said latch means is between said lid member and said bail.

7. The lid and bail assembly as defined in claim 1 wherein said lid member is hinged to said ring member at a hinged connection, said bail having one bail end portion attached to said lid member adjacent said hinged connection and an opposite bail end portion attached to said lid member on the opposite side thereof from said hinged connection, said locking means between said ring member and said opposite bail end portion.

8. The lid and bail assembly as defined in claim 7 wherein said lid member has a bail pivot pin pivotally attached thereto opposite from said hinged connection and said opposite bail end portion extends through said bail pivot pin, said ring member having a hole therethrough adjacent said bail pivot pin and said opposite bail end portion terminating in a hook portion which is aligned with and freely extendable through said hole in said generally vertical position of said bail, said locking means being defined by said hole and said hook portion.

9. The lid and bail assembly as defined in claim 8 wherein said latch means selectively locks said bail pivot pin against pivotal movement relative to said lid member.

10. The lid and bail assembly as defined in claim 9 wherein said latch means comprises an axially movable latch pin on said cover movable downwardly adjacent a flat on said bail pivot pin to prevent pivotal movement of said bail pivot pin in said generally vertical position of said bail and being movable upwardly clear of said bail pivot pin to free said bail pivot pin for pivotal movement.

* * * * *